April 30, 1946.  K. C. CLARK  2,399,207
AUXILIARY WHEEL AND TIRE CARRIER
Filed Oct. 25, 1941  2 Sheets-Sheet 1

INVENTOR.
KENNETH C. CLARK
BY Munn, Liddy, Glaccum & Kane
ATTORNEYS

April 30, 1946.　　　K. C. CLARK　　　2,399,207
AUXILIARY WHEEL AND TIRE CARRIER
Filed Oct. 25, 1941　　　2 Sheets-Sheet 2
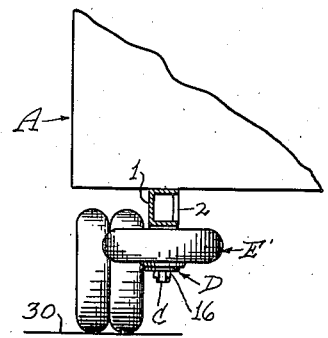
Fig. 3.
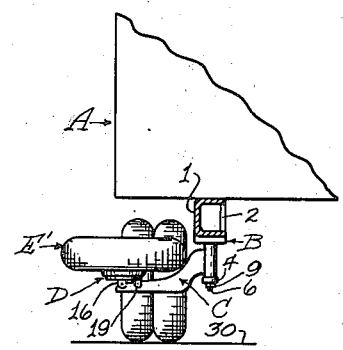
Fig. 4.
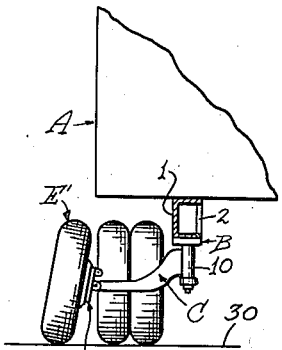
Fig. 5.
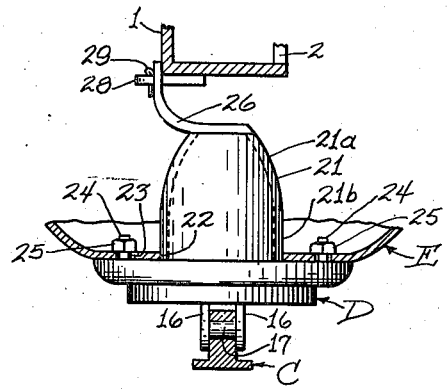
Fig. 7.　　　Fig. 6.
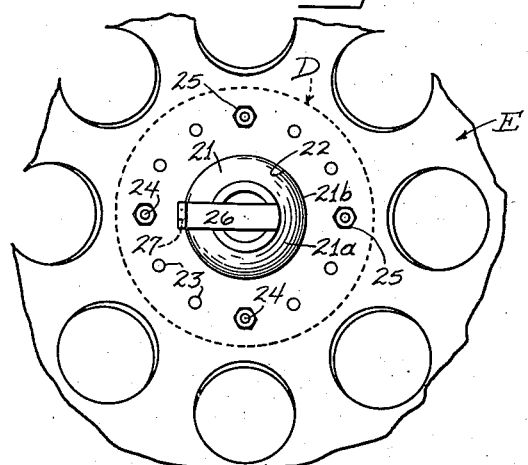
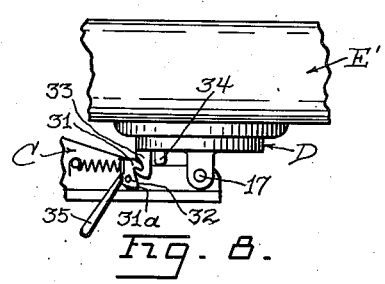
Fig. 8.
INVENTOR.
KENNETH C. CLARK
BY Munn, Liddy, Glascum & Kane
ATTORNEYS Patented Apr. 30, 1946

2,399,207

UNITED STATES PATENT OFFICE 2,399,207

AUXILIARY WHEEL AND TIRE CARRIER

Kenneth C. Clark, Watsonville, Calif.

Application October 25, 1941, Serial No. 416,507

3 Claims. (Cl. 224—29)

The present invention relates to improvements in an auxiliary wheel and tire carrier, and it consists of the combinations, constructions and arrangements hereinafter described and claimed.

Auxiliary truck wheels with their tires are heavy, some of them weighing two hundred and seventy pounds each, and it is difficult to move these auxiliary wheels and tires from the place where they are carried by the truck or trailer to the axle on which they are to be mounted. An object of my invention is to provide a tire carrier which will support the auxiliary wheel and tire on an arm pivoted to the truck or trailer, this arm being swingable from a position where the auxiliary wheel is disposed out of the way into a position where the wheel may be removed.

A further object of my invention is to provide a hinged platform to the swingable arm, this platform supporting the auxiliary wheel with its tire and being swingable after the wheel has been moved into free position so that the wheel may be inclined to dispose the tire portion on the ground. This obviates the necessity of the operator lifting the wheel from the support and permits the wheel to be entirely freed after the tire contacts with the ground. The operator does not have to lift the entire weight of the wheel and tire during this operation.

Still a further object of my invention is to provide an auxiliary wheel and tire support in which a central guide is carried by the platform around which the wheel may be rotated after the wheel is lifted above the ground in order to align the stud receiving openings in the wheel with fastening means carried by the platform. Here again the rotation of the tire is accomplished after it is supported by the platform and this does away with the necessity of the operator lifting the auxiliary wheel while aligning it with the fastening means.

A further object of my invention is to provide a device of the type described which is simple in construction and durable and efficient for the purpose intended.

Other objects and advantages will appear in the following specification, and the novel features of the device will be particularly pointed out in the appended claims.

My invention is illustrated in the accompanying drawings forming a part of this application, in which:

Figure 3 is a section taken substantially along the line 3—3 of Figure 1;

Figure 4 is similar to Figure 3 and shows the tire carrying arm swung into open position;

Figure 5 is a similar view, but shows the platform swung to lower the tire onto the ground;

Figure 6 is a sectional view taken substantially along the line 6—6 of Figure 2;

Figure 7 is a top plan view of a portion of the auxiliary wheel and illustrates how it can be attached to the platform; and Figure 8 is a detail of a modified form of the invention.

While I have shown only the preferred form of my invention, it should be understood that various changes or modifications may be made within the scope of the appended claims without departing from the spirit of the invention.

In carrying out my invention, I make use of a vehicle, indicated generally at A, and the vehicle may be a truck, a trailer, or a semi-trailer. The device comprises a casting B which is secured to the chassis 1 of the frame by any suitable means, such as welding, or by clamps (not shown). If the chassis frame is channel-shaped, as indicated in Figures 3, 4 and 5, a block 2 may be disposed in the channel at the point where the casting is secured thereto and this will strengthen the channel. The block may be welded in place if desired.

Figure 1:
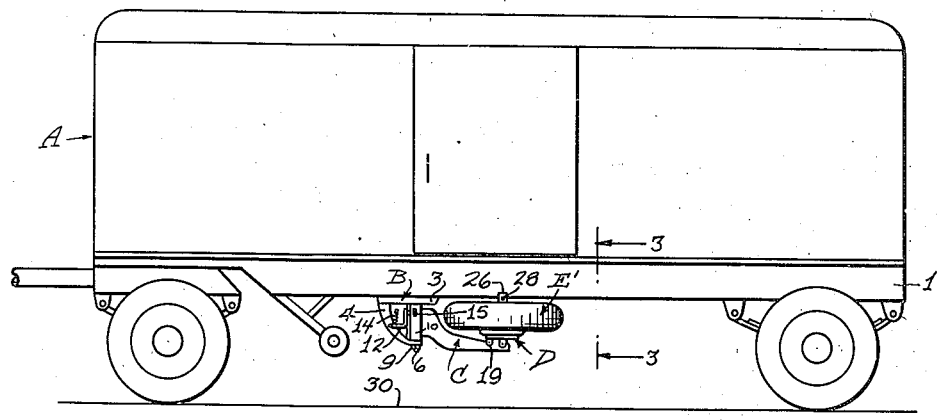
Figure 1 is a side elevation of a trailer showing my device operatively applied thereto.
Figure 2:
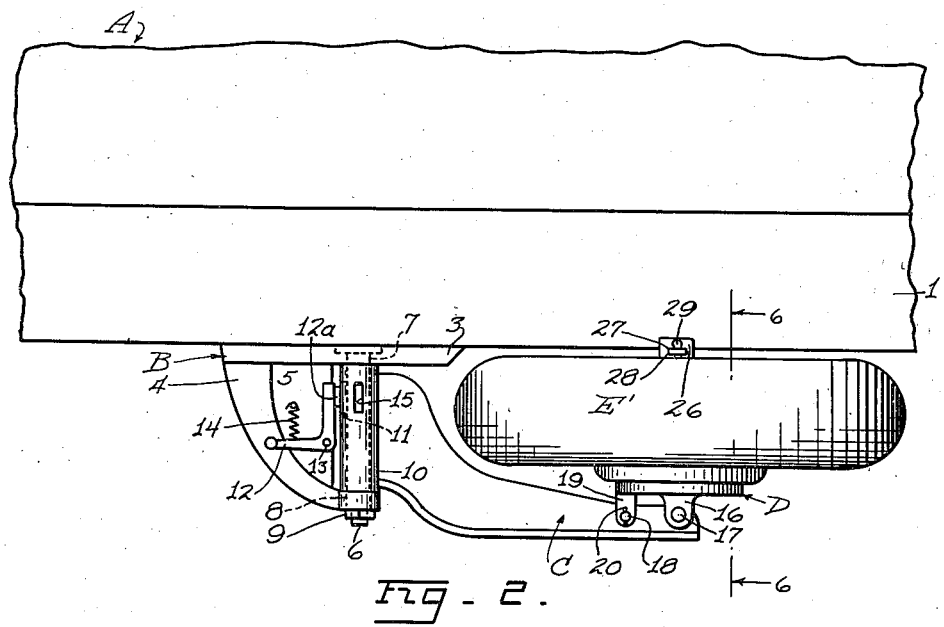
Figure 2 is an enlarged view of the device.

Figure 2 illustrates the casting B as consisting of a top member 3 and a truss 4. The truss has a strengthening web 5. A large bolt 6 is passed through an opening 7 in the member 3 and the bolt head is received in a recess in the member 3. The lower end of the bolt extends through an opening 8 in the truss 4 and a nut 9 holds the bolt in place.

An auxiliary wheel carrying arm, indicated generally at C, has a sleeve 10 that is rotatably mounted on the bolt 6, and the arm may be in the form of an I-beam, a T-beam, or any other type of structure which will provide the necessary strength. I have shown an inverted T-beam in the present illustration. The arm is swingable about the bolt 6 as a pivot, and I provide means for holding the arm in either one of its two positions into which it may be swung. The sleeve 10 has a slot 11 aligned with the longitudinal axis of the arm C and when the arm extends in the direction of the length of the chassis 1, this slot will be in a position to receive a spring-pressed keeper 12, see Figure 2. The keeper is in the shape of a bell crank lever and is pivoted at 13 on the web 5. A spring 14 urges the latch 12a of the keeper into the slot 11 and this will lock the arm against swinging in either direction. A second slot 15 is disposed 90° from the slot 11 and will register with the latch 12a when the arm C extends at right angles to the chassis. The latch will therefore hold the arm C in the direction of the length of the chassis or at right angles thereto.

At the free end of the arm I mount a platform D. The platform has downwardly extending ears 16, see Figure 6, that straddle the arm C and are pivotally connected to the arm at 17. The platform may be swung about the pivot 17 from a horizontal position into the inclined position shown in Figure 5. The swinging of the platform is accomplished after the arm C has been swung into its open position. The platform is secured in a horizontal position by any suitable fastening means such as a bolt 18 passed through depending lugs 19 carried by the platform D and adapted to straddle the arm C. The bolt is passed through aligned openings in the arm C and the lugs 19 for securing the platform against tipping accidentally. A cotter pin 20 may be used for holding the bolt against accidental removal.

In Figure 6, I show the platform D as carrying a central guide member 21 that has a tapered portion 21a merging into a cylindrical portion 21b. The central guide 21 is adapted to receive the central opening 22 in an auxiliary wheel indicated generally at E. The wheel E is of standard construction and has a tire E' mounted thereon. The wheel also has openings 23 for receiving studs 24 carried by the platform D. The openings 23 are the same ones used to receive the studs when connecting the auxiliary wheel to the axle. The platform D may carry one or more studs and I have shown four in Figure 7. In actual practice, three studs will likely be used. The studs 24 receive nuts 25 which secure the auxiliary wheel and tire on the platform D.

The central guide may have an auxiliary support for aiding in and supporting the arm C. The auxiliary support is shown at 26 and has an opening 27 for receiving a bolt 28 carried by the chassis. The support is held in place by a cotter pin 29 that is passed through an opening in the bolt. The bolt enters the opening 27 when the arm C is swung from open to closed position.

From the foregoing description of the various parts of the device, the operation thereof may be readily understood.

The tire with its auxiliary wheel when being mounted on the device is first rolled into a position where it will lean against the inclined platform, see Figure 5, which has previously been swung into this position for the purpose. The support 26 is threaded through the opening 22 and then the guide 21 will enter the opening. If the studs 24 do not register with any of the wheel openings 23, the registration is effected after the wheel has been swung into a horizontal position by the platform and rotated about the central guide until registration is effected, whereupon the wheel will drop into place and will be fastened by the studs 24 and nuts 25. The swinging of the wheel and the platform into a horizontal position is readily accomplished because the entire weight of the wheel need not be lifted by the operator, the pivot point 17 carrying this weight during the movement. Of course the arm C extends at right angles to the chassis during the assembly of the auxiliary wheel on the platform. When the platform D is swung into a horizontal position, the openings in the lugs 19 will register with the opening (not shown) in the arm C and the bolt 18 is moved through the aligned openings to secure the platform against accidental swinging. During this mounting operation, the arm C is held against swinging by the latch 12a being received in the slot 15.

The operator now frees the latch from the slot and swings the arm C with the platform D and the auxiliary wheel E under the vehicle body into a position where the arm will align with the longitudinal axis of the chassis. The latch 12a now enters the slot 11 and will lock the parts against movement. During the swinging of the arm C into alignment with the chassis, the support 26 will cause its opening 27 to receive the bolt 28. The cotter pin 29 secures the support against accidental removal. The arm C will now be supported by the bolt 6 and by the bolt 28 although the bolt 6 may be sufficient. The auxiliary tire is held in an out of the way position where it may be readily reached for removal when desired.

In removing the wheel from the device, the reverse operation takes place to that just described. The arm C is first swung into open position, as shown in Figure 5, and then the platform is tilted for lowering the wheel until the tire touches the ground 30. The nuts 25 may now be removed and then the wheel freed from the platform and rolled to the axle on which it is to be mounted. During the entire operation of mounting the wheel on the device and the removal of the wheel from the device, the operator does not have to lift the auxiliary wheel and tire.

In Figure 8, I show a modified form of the device in which the platform D has novel means for automatically locking it in horizontal position when the platform is manually swung into a horizontal position. This obviates the necessity of the operator moving the bolt 18 through the aligned openings in the lugs 19 when the platform is in a horizontal position. The arm C carries a spring-actuated catch 31 which is pivoted at 32 and is designed to engage automatically with a depending hook 33 carried by the platform D when the platform is in a horizontal position. The arcs of the contacting portions of the latch 31 and hook 33 are such as to permit the latch 31 to engage automatically with the hook when the platform D is in horizontal position. A projection 34 carried by the platform D bears against the top of the arm C when the platform is in a horizontal position and this will prevent the platform from swinging in a counterclockwise direction when looking at Figure 8. The latch 31, of course, prevents the swinging of the platform in a clockwise direction and therefore the platform is locked as a unit to the arm.

When the operator wishes to free the platform so as to swing it about the pivot 17, he actuates a handle 35 of the latch 31 to swing the latch free from the hook and permit the platform to be tilted. The latch has a projection 31a that engages with the arm C to hold the latch in the operative position shown to receive the hook 33 when the platform is swung into a level position. The device functions semi-automatically when a tire and wheel are placed on the platform D and moved into inoperative position. The operator merely swings the tire after securing the wheel and tire to the platform and this will swing the platform into a horizontal position. The latch 31 will automatically engage with the hook when the platform reaches a horizontal position. The operator now swings the tire so that the arm C will move from open to closed position. When the arm reaches closed position, the latch 12a will automatically enter the opening 11 and secure the parts against further movement until the latch is manually released.

I claim:

1. A wheel and tire carrier comprising an arm pivoted to the underside of a vehicle body and being swingable in a horizontal plane to swing the free end of the arm from a position under the vehicle to one alongside the vehicle, a wheel and tire-supporting platform hinged to the free end of the arm and being swingable about a horizontal axis that extends at right angles to the longitudinal axis of the arm, said platform when in normal position resting on top of the arm and lying in a horizontal plane, the pivotal axis of the platform being disposed at approximately the gravitational center of the wheel and tire carried by the platform and being positioned close enough to the ground so that when the platform and wheel are tilted into a substantially upright position, the tire will contact with the ground and support the wheel.

2. A wheel and tire carrier comprising an arm pivoted to the underside of a vehicle body and being swingable in a horizontal plane to swing the free end of the arm from a position under the vehicle to one alongside the vehicle, a wheel and tire-supporting platform hinged to the free end of the arm and being swingable about a horizontal axis that extends at right angles to the longitudinal axis of the arm, said platform when in normal position resting on top of the arm and lying in a horizontal plane, the pivotal axis of the platform being disposed at approximately the gravitational center of the wheel and tire carried by the platform and being positioned close enough to the ground so that when the platform and wheel are tilted into a substantially upright position, the tire will contact with the ground and support the wheel, releasable means for holding the arm for positioning its free end under the vehicle or alongside the vehicle, and means for securing the platform to the arm in a horizontal position.

3. A wheel and tire carrier comprising an arm pivoted to the underside of a vehicle body and being swingable in a horizontal plane to swing the free end of the arm from a position under the vehicle to one alongside the vehicle, a wheel and tire-supporting platform hinged to the free end of the arm and being swingable about a horizontal axis that extends at right angles to the longitudinal axis of the arm, said platform when in normal position resting on top of the arm and lying in a horizontal plane, the pivotal axis of the platform being disposed at approximately the gravitational center of the wheel and tire carried by the platform and being positioned close enough to the ground so that when the platform and wheel are tilted into a substantially upright position, the tire will contact with the ground and support the wheel, releasable means for holding the arm for positioning its free end under the vehicle or alongside the vehicle, means for securing the platform to the arm in a horizontal position and means for securing the free end of the arm to the body when the arm is positioned under the body.

KENNETH C. CLARK.